United States Patent [19]
Naden

[11] 3,983,383
[45] Sept. 28, 1976

[54] PROGRAMMABLE ARITHMETIC AND LOGIC BUBBLE ARRANGEMENT

[75] Inventor: Rex Alan Naden, Richardson, Tex.

[73] Assignee: Texas Instruments Incorporated, Dallas, Tex.

[22] Filed: May 10, 1974

[21] Appl. No.: 468,963

[52] U.S. Cl. ............................ 235/176; 340/174 TF
[51] Int. Cl.² ..................... G06F 7/50; G11C 11/14
[58] Field of Search ........................... 235/176, 168; 340/174 TF; 307/88 LC

[56] References Cited
UNITED STATES PATENTS

| | | | |
|---|---|---|---|
| 3,689,751 | 9/1972 | Chow .................................. | 235/176 |
| 3,723,716 | 3/1973 | Bobeck et al. ..................... | 235/176 |
| 3,798,607 | 3/1974 | Minnick et al. ........... | 340/174 TF X |

OTHER PUBLICATIONS

M. R. Garey, "Resident-Bubble Cellular Logic Using Magnetic Domains" IEEE Trans-on Computers Apr. 1972 pp. 392-396.

Primary Examiner—David H. Malzahn
Attorney, Agent, or Firm—Harold Levine; James T. Comfort; William E. Hiller

[57] ABSTRACT

A programmable bubble material arrangement employing a plurality of logic components for performing eight different possible logic and arithmetic operations on two applied serial digital data streams. Separately applied control signals in the form of bubbles are applied to the arrangement to selectively program the arrangement, as desired. The logic components include transient bubble switches, resident bubble switches, bubble generators, bubble annihilators, exclusive merge elements, disjoint crossover elements and delay elements. The operations selectively performed are: A + B, A + B, AB, A plus B with carry, $\overline{A}$ + B, $\overline{A}$ + B, $\overline{AB}$, and A plus B with carry. The arrangement operates equally with data streams either loosely packed (data bubbles periodically placed in the stream) or tightly packed.

11 Claims, 15 Drawing Figures

FIG.1
BUBBLE GENERATOR
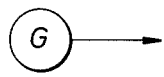
FIG.2
BUBBLE ANNIHILATOR
FIG.3
TRANSIENT BUBBLE SWITCH
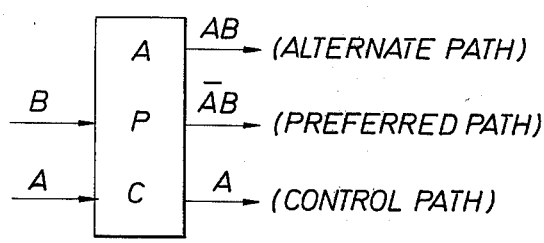
FIG.6
EXCLUSIVE MERGE
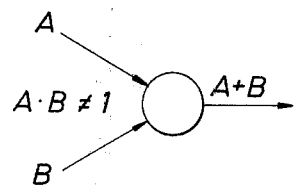
FIG.5
RETROGRADE TRANSIENT
BUBBLE SWITCH
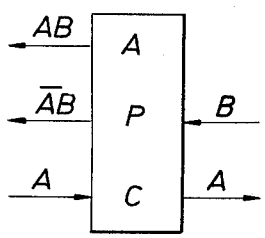
FIG.7
DISJOINT CROSSOVER
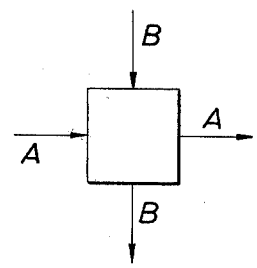
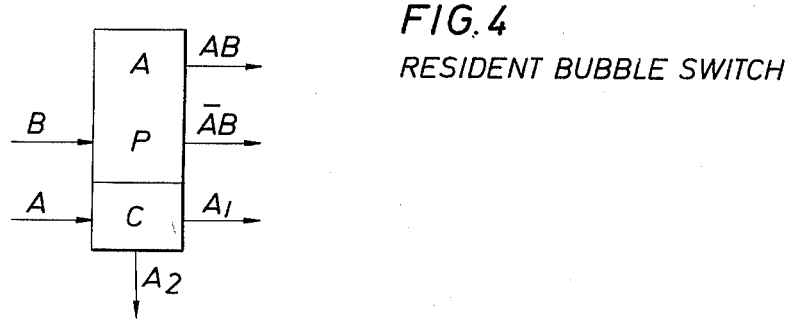
FIG.4
RESIDENT BUBBLE SWITCH

AND

OR

NOT

FANOUT

EXCLUSIVE OR (HALF ADDER)

FIG. 15   TABLE OF ARITHMETIC FUNCTION PROGRAMMING

| C1 | C2 | C3 | C4 | C5 | CL* | OUTPUT FUNCTION F(A,B) |
|----|----|----|----|----|-----|------------------------|
| 1  | X  | 1  | 0  | 0  | 0   | A+B                    |
| 0  | 1  | 1  | 0  | 0  | 0   | A⊕B                    |
| 0  | 0  | 1  | 0  | 0  | 0   | AB                     |
| 0  | 0  | 0  | 1  | 0  | 0   | A PLUS B WITH CARRY    |
| 1  | X  | 1  | 0  | 1  | 1   | $\bar{A}$ + B          |
| 0  | 1  | 1  | 0  | 1  | 1   | $\bar{A}$ ⊕ B          |
| 0  | 0  | 1  | 0  | 1  | 1   | $\bar{A}$ B            |
| 0  | 0  | 0  | 1  | 1  | 1   | $\bar{A}$ PLUS B WITH CARRY |

*NUMBER OF BUBBLES INSERTED DEPENDENT ON DATA DENSITY

PROGRAMMABLE ARITHMETIC AND LOGIC BUBBLE ARRANGEMENT

BACKGROUND OF THE INVENTION

1. Field of the Invention

This invention relates to a versatile unit employing single wall magnetic domains and more particularly to an arrangement of such domains to form a selectably programmable arithmetic and logic unit capable of performing a plurality of functions.

2. Description of Prior Art

The controlled movement of single wall domains, or bubbles, in a slice of magnetic material in response to a reorienting magnetic field is disclosed by A. H. Bobeck in U.S. Pat. No. 3,460,116 issued Aug. 5, 1969. Typically, the movement of the domains is controlled by the juxtaposition of a magnetically soft overlay with a surface of the material in which the domains are propagated. The overlay elements are constructed in such a manner that different points become magnetically attractive at different magnetic field orientations, thereby defining a path or channel that is followed by a domain. One such overlay, commonly referred to as a T and Bar overlay, is detailed in the above-mentioned Bobeck patent and is arranged to control the movement of magnetic domains in response to a reorienting magnetic field, illustratively having four quadrants or reorientations, per cycle of rotation. Other Permalloy overlay configurations, such as Chevron patterns may also be employed. In addition, ionimplanted garnet circuits following the organization of the Permalloy circuits have also been developed.

The usefulness of any such device depends upon the geometry of the respective elements with respect to each other. Thus the elements are advantageously arranged to take advantage of the fact that all domains in a slice of magnetic material under the influence of the same rotating field will propagate in that material in synchronous relationship with each other. Accordingly, domains which are propagated along different paths will arrive at certain points of the overlay in a predetermined coordinated relationship. This physical control of magnetic domains in spatial coordination coupled with the interaction forces between domains in close relationship with each other permits consecutive logic operations to be performed between corresponding representations of different sets of information representations solely within magnetic domain technology provided the representations are organized in a form to capitalize on those properties.

It is possible to take advantage of the fact that the physical location of any magnetic domain in such a device is definable in terms of discrete preset element patterns. Hence, it is possible to organize the device or unit to attain various arithmetic and logic or system functions. U.S. Pat. Nos. 3,750,106 and 3,753,253 relate to functional magnetic domain arrangements capable of performing some logic operations. The operation of binary addition, which is very important in computer architecture, is not shown or suggested by these patents. Primarily, this is because of the lack of ability to process "carry" information inherent in adding two serial binary-coded data streams. Neither is the separation of programming signals from data signals, the arrangements disclosed therein including common input channels for both, their differentiation being coded in the data application. This is particularly disadvantageous for a unit capable of performing arithmetic operations, where the serial handling of the data might interfere with programming instruction coding. Further, there is no provision for handling data streams wherein not every bubble is related to a common word.

Accordingly, it is a feature of the present invention to provide an improved magnetic domain logic unit also capable of performing the arithmetic operation of addition.

It is another feature of the present invention to provide an improved magnetic domain arithmetic and logic unit for handling serial data so that the data streams and the control signals are separately applied.

It is still another feature of the present invention to provide an improved magnetic domain arithmetic and logic unit for handling streams of data wherein there are a plurality of data words interleaved therein.

SUMMARY OF THE INVENTION

A preferred embodiment of the present invention includes a body of magnetic material capable of supporting magnetic domains, the material being arranged for the selective performance of serial arithmetic and logic operations on two data streams of digital information present in the form of bubbles, and a periodic drive means coupled to the magnetic arrangement moving the bubbles one step at a time. Separate inputs are provided for the data stream and for a plurality of control signals to logic and arithmetic elements included in the material arrangement. These logic and arithmetic elements include transient bubble switches, resident bubble switches, bubble generators, bubble annihilators, exclusive merge elements and disjoint crossover elements. A delay line is provided in conjunction with a carry loop for providing the arithmetic operation of addition.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings:

FIG. 1 is a schematic diagram of a bubble generator in accordance with the present invention.

FIG. 2 is a schematic diagram of a bubble annihilator in accordance with the present invention.

FIG. 3 is a schematic diagram of a transient bubble switch in accordance with the present invention.

FIG. 4 is a schematic diagram of a resident bubble switch in accordance with the present invention.

FIG. 5 is a schematic diagram of a retrograde transient bubble switch in accordance with the present invention.

FIG. 6 is a schematic diagram of an exclusive merge element in accordance with the present invention.

FIG. 7 is a schematic diagram of a disjoint crossover element in accordance with the present invention.

FIG. 15 is a table of arithmetic function programming of the preferred embodiment illustrated in FIG. 14.

DESCRIPTION OF PREFERRED EMBODIMENTS

Figure 8:
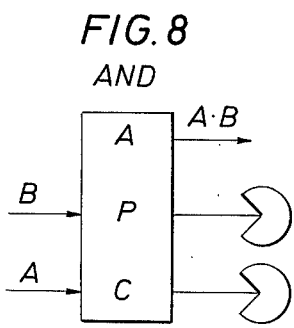
FIG. 8 is a schematic diagram of an AND gate in accordance with the present invention.

For purposes wherein, a systematic designation has been employed with respect to the logic elements to illustrate the movement of domains from place to place and to facilitate a more complete understanding of the illustrated embodiment of the invention. FIG. 1 illustrates a bubble generator, which produces a predetermined number of bubbles in a unit of time. This time is synchronous with the cyclical processing time of the bubbles in the data bits. That is, each time a data bit is processed a step along its path, a bubble is produced from a bubble generator. Similarly, FIG. 2 illustrates the annihilation of all bubbles applied thereto.

FIG. 3 illustrates an element referred to as a transient bubble switch, such as that shown in FIG. 4 of U.S. Pat. No. 3,750,106, which is incorporated herein by reference. There are three main sections of this switch: the control path, designated C; the preferred path, designated P; and the alternate path, designated A. There are two inputs, one each for receiving data logic streams A and B. As illustrated, data stream A is applied to the control path and data stream B is applied to the preferred path.

Either bubbles (indicative of logic one) or voids (indicative of logic zero) in data stream A will pass through control path C to appear at the output. Should the data bubble at A be a void, then the bubble or void appearing in data stream B and arriving at the switch concurrently with the bubble at A will pass along the preferred path to appear at the output. On the other hand, should data stream A have a bubble in the control path while data stream B has a bubble, the bubble in data stream B is forced to alternate path A to appear at the output thereof, while a void will appear at the output of preferred path B. Hence, the output of alternate path A is logic AB (A AND B) and the output of preferred path P is logic $\overline{A}B$ (NOT A or inverted A AND B).

FIG. 4 illustrates a resident bubble switch which is identical to the transient bubble switch of FIG. 3, with one exception. In this case, an applied bubble in control path C is retained until a subsequent bubble is applied. At the time of the second bubble, the first bubble becomes an output on line $A_1$ and the second bubble becomes an output on line $A_2$. That is, not only does the second bubble force the first bubble from the switch, the second bubble immediately passes along a second control path output without being retained. Otherwise, the operation of the switch is the same as for the transient switch. That is, when no bubble is in the control path, bubbles applied as input B take preferred path P through the switch. When there is a bubble in the control path, bubbles applied as input B take alternate path A and labeled AB.

FIG. 5 illustrates a retrograde transient bubble switch. This switch is identical to the switch illustrated in FIG. 3 except that input bubbles B are applied to the switch from the opposite direction such that the bubbles B exit from the opposite side of the switch and in the opposite direction as compared to the switch of FIG. 3. However, the operation is identical with the FIG. 3 switch in that the presence of a bubble A in control path C causes bubble B to exit at alternate path A. A bubble void in the control path causes bubble B to exit at preferred path P.

FIG. 6 illustrates an exclusive merge gate. That is, the gate reduces the paths of two data streams down to one provided that the merge gate is not presented a bubble from each data stream simultaneously. Or, in logic terminology, the gate produces A + B so long as AB ≠ 1.

FIG. 7 presents a disjoint crossover gate, which merely allows a bubble as input A to continue through the gate to appear as output A and allows a bubble as input B to continue through the gate to appear as output B. The gate permits this operation even though bubbles A and B may enter in the gate simultaneously.

Note that it is possible to make a resident bubble switch from two transient switches and some related components. For example, switches 110 and 112 in FIG. 14 and their related components effectively produce a loop for circulating bubbles such that on each timing event a bubble may be moved into the control path of switch 110 even though a bubble exited during the same timing event.

Several basic logic realizations may be constructed using a combination of the logic elements described above. Some of these are illustrated in FIGS. 8–13.

Figure 9:
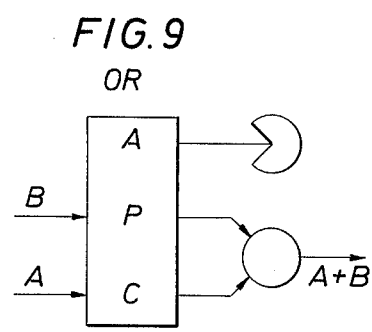
FIG. 9 is a schematic diagram of an OR gate in accordance with the present invention.

FIG. 8 illustrates an AND gate using the transient bubble switch of FIG. 3 and two annihilators. The output from alternate path A is true when both A and B are true. FIG. 9 combines the transient bubble switch with an annihilator and an exclusive merge gate. The merge gate accepts the outputs from the control path and the preferred path, the alternate path terminating in the annihilator. No output can occur in the preferred path when there is a bubble in the control path, thereby satisfying the input requirements for the exclusive merge gate. Further, it may be seen that there is an output from the merge gate whenever there is either an A or a B bubble.

Figure 10:
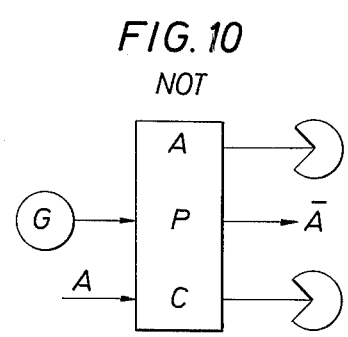
FIG. 10 is a schematic diagram of a NOT gate in accordance with the present invention.

FIG. 10 illustrates a NOT gate using a generator applied to the preferred path of a transient switch and annihilators connected to receive the control path and alternate path outputs. Note that there is an output from the preferred path only when no bubble is present in the control path. The output $\overline{A}$ is sometimes referred to as the "inverted" output.

Figure 11:
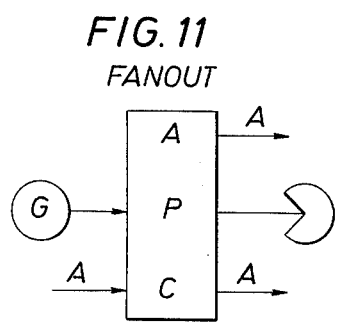
FIG. 11 is a schematic diagram of a FANOUT gate in accordance with the present invention.

FIG. 11 illustrates a FANOUT gate by connecting a generator to the input of the preferred path and an annihilator to the output of the preferred path of a transient switch. Each time a bubble A is applied to the control path, a bubble A occurs at the output thereof and also another bubble A occurs at the output of the alternate path.

Figure 12:
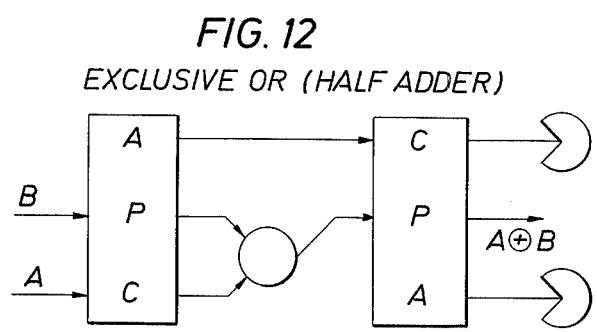
FIG. 12 is a schematic diagram of an exclusive OR, otherwise known as a half adder, in accordance with the present invention.

FIG. 12 illustrates an exclusive OR gate, otherwise commonly referred to as a "half adder." Two transient switches are used. An exclusive merge element receives the outputs from the control and preferred paths of the first transient switch, as with the OR gate shown in FIG. 9, and the output therefrom is applied as the input of the preferred path in the second transient switch. The output from the alternate path of the first switch is applied as the input to the control path of the second switch. The output from the preferred path of the second switch occurs when there is a bubble A but no bubble B, or when there is a bubble B but no bubble A.

To analyze this, assume the presence of both bubble A and B. Bubble A goes through the exclusive merge element and bubble B goes through the alternate path of the first transient switch to be applied as the input of the control path of the second transient switch. When bubble A arrives in the preferred path of the second switch, it is caused to move to the alternate path of the second switch. Hence, the net result is an exclusive OR output from the preferred path of this switch.

Figure 13:
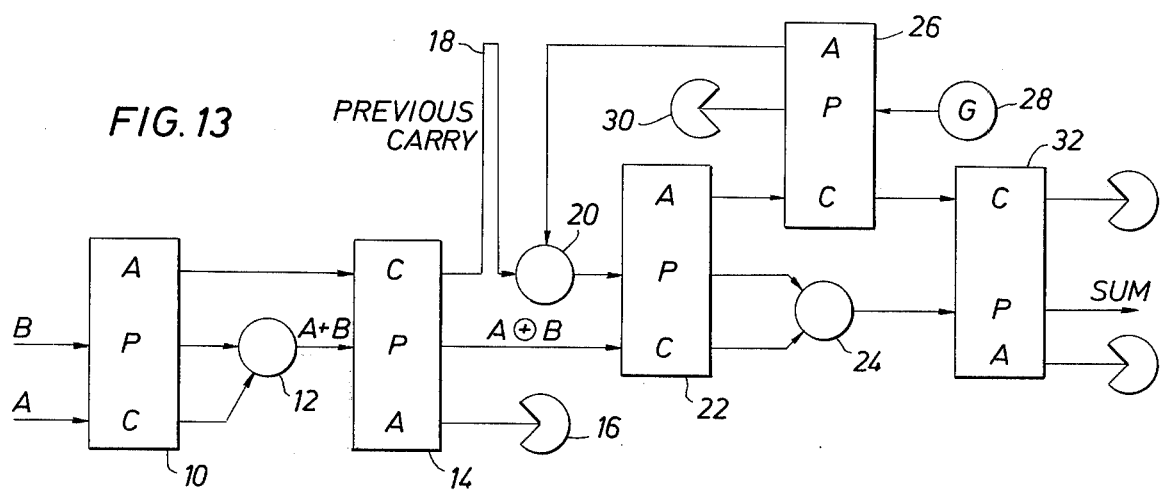
FIG. 13 is a schematic diagram of a full adder in accordance with the present invention.

FIG. 13 illustrates a "full adder." The half adder of FIG. 12 is employed utilizing transient switch 10, exclusive merge element 12, transient switch 14 and annihilator 16 connected to output of the alternate path of switch 14, all in accordance with the description above for FIG. 12. A previous carry delay line 18 is connected to the output of the control path of switch 14, for a purpose to be explained hereafter. The output of delay line 18 is applied to exclusive merge element 20. The output from merge element 20 is connected as the input to the preferred path of transient bubble switch 22 and the output of the preferred path of switch 14 is applied as the input to the control path of switch 22. The outputs of the preferred and control paths of switch 22 are applied as inputs to exclusive merge element 24 and the output of the alternate path of switch 22 is applied as input to the control path of retrograde transient bubble switch 26. Generator 28 is applied as the input to the preferred path of switch 26 and annihilator 30 is connected to the output thereof. The output from the alternate path of switch 26 is connected as an input to merge element 20.

The output from the control path of switch 26 is applied as the input to the control path of transient bubble switch 32 and the output from merge element 24 is applied as the input to the preferred path of switch 32. The sum is taken from the output of the preferred path of switch 32.

In operation, every time there is an A or B bubble, the output from the preferred path of switch 14 is passed through the control path of switch 22, through merge element 24 and through the preferred path of switch 32.

If there is both an A and B bubble, then there is an output to delay line 18 representing a previous carry, which is applied through merge element 20, switch 22, merge element 24 and switch 32 provided that at the next sequence time, there is no A or B signal applied to the control path of switch 22. If there is an A or B signal the next time, the delay line is still emptied through merge element 20, but now is caused to exit from the alternate path of switch 22. Note that when there is an A or B signal there is no input to delay line 18 and therefore this "previous carry" element is not refilled.

The next sequence which occurs presents an input to merge element 20 from switch 26 operating as an effective FANOUT gate, as explained in connection with FIG. 11. It will be allowed to be added to the sum via the preferred path of switch 22, again provided there is no A or B signal applied simultaneously to the control path thereof. Note that the refilling of delay line 18 only occurs in response to the simultaneous presence of A and B. Therefore, when this occurs, if there is a circulating carry bubble in switch 26, it is allowed to pass through merge gate 20 to be eventually summed at the output of the adder. Hence, the circuit operates as a full adder to produce a summation output from switch 32 in serial format, starting at the least significant digit of input data streams A and B.

Figure 14:
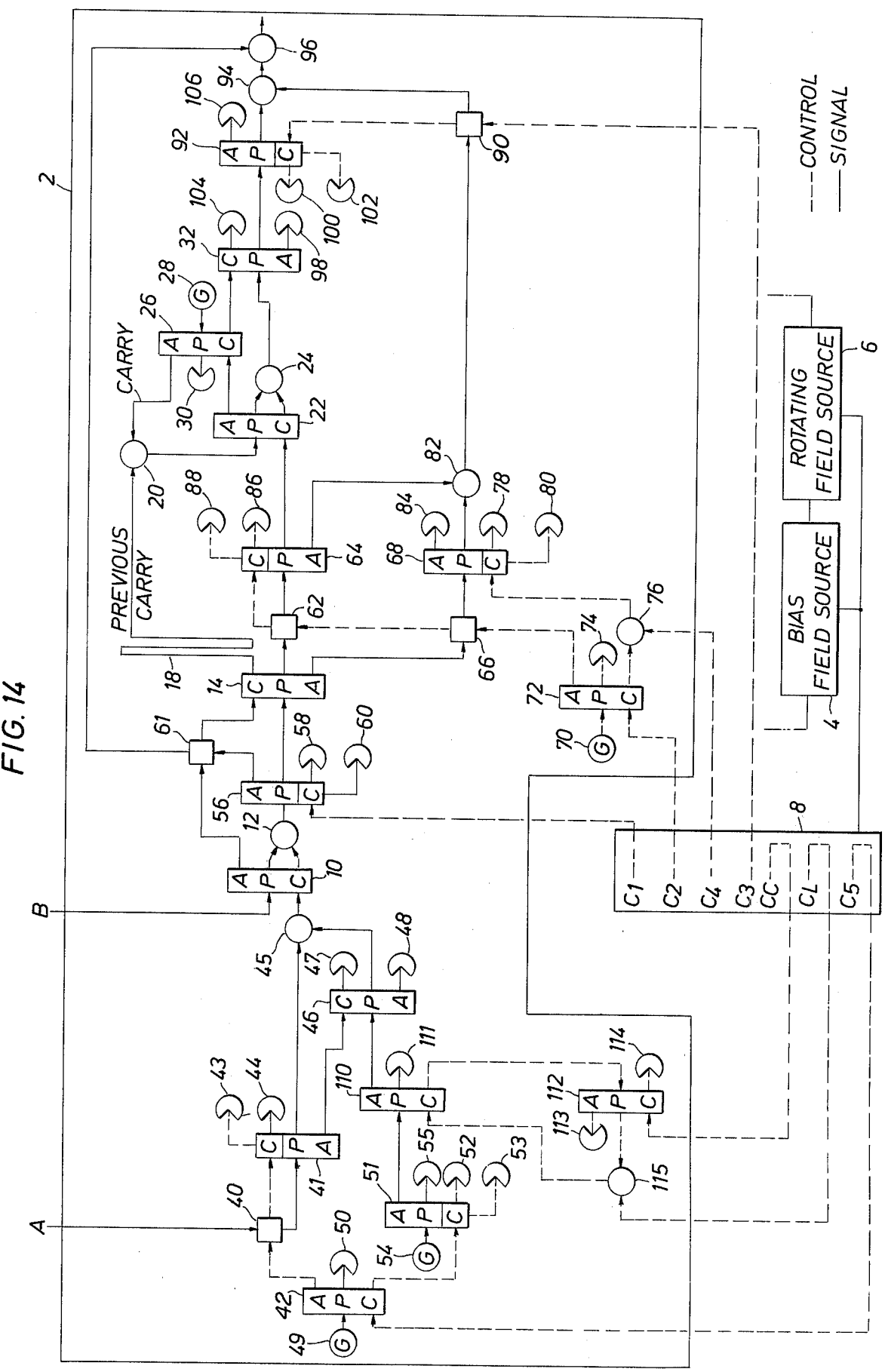
FIG. 14 is a schematic diagram of a preferred embodiment of the present invention.

Now referring to FIG. 14, an all-bubble arithmetic logic unit in accordance with the present invention is illustrated, the unit being programmable through the use of bubble control signals applied to resident bubble switches. The solid lines in the unit represent the data paths and the dotted lines in the unit represent the control signal paths.

The unit is constructed on a suitable substrate 2. The material arrangement for supporting the bubble domain is typically secured adjacent one surface thereof and arranged as hereafter explained. A bias field source 4 and a rotating field source 6 are conventionally connected to each other and coupled to the material arrangement to provide a periodic drive means to propagate the bubbles step-by-step through the material arrangement. Typically, each full rotation of the rotating field progresses bubble movement one step. Provision for programming of the unit is made via a plurality of control signals in accordance with the description hereafter set forth. The control signals can be provided in two ways: (1) by current-controlled bubble generators operated in synchronism with the rotating field; and (2) by additional bubble logic circuitry contained elsewhere on the same device.

It may be first observed that the heart of the unit is the full adder discussed above with regard to FIG. 13. Accordingly, like elements in FIGS. 13 and 14 are designated with the same reference numerals. FIG. 15 illustrates a table for the programming of the unit shown in FIG. 14 for performing various arithmetic operations. In the table "zero" means that the control operation path is presented with a void; "one" means that the control operation path is presented with a bubble; and X means that it is immaterial whether "zero" or a "one" is presented at the control operation path. Further, it should be recalled if a bubble is "resident" in the control path of a resident bubble switch, application of a bubble reprograms the control path for "zero," since both the resident bubble and the programmed bubble pass through the switch. On the other hand, a control path already programmed for "zero" is programmed for "one" with the application of a bubble, which lodges when the control path is previously void.

The left side of the unit shown in FIG. 14 illustrates circuits not primarily involved with the full adder portion, but which are necessary for performing some of the other arithmetic and logic functions performable by the unit. Input signal B is applied directly to switch 10, previously discussed. Signal A is applied through disjoint crossover element 40 to the preferred input path of resident bubble switch 41. The control path of switch 41 receives its input from the alternate output path of transient bubble switch 42 via crossover 40. The control path outputs of switch 41 are applied to annihilators 43 and 44.

The output of the preferred path of switch 41 is applied to exclusive merge element 45 and the alternate path output of switch 41 is applied to the input of the control path of transient bubble switch 46. The preferred path output of switch 46 is applied to merge element 45 and the control path output and alternate path output of switch 46 are applied to annihilators 47 and 48, respectively.

Switch 42 operates in conjunction with generator 49 and annihilator 50 connected to the input and output of its preferred path, respectively. The control path input is connected to receive control signal C5 and the control path output is connected to the control path input of resident bubble switch 51. The outputs of the control path of this switch are connected to annihilators 52 and 53, respectively. The preferred path is connected at its input to generator 54 and at its output to annihilator 55.

The output of the alternate path of switch 51 is connected to the input of the preferred path of transient switch 110. The output of the preferred path is connected to annihilator 111. The output of the alternate path is connected as the input of the preferred path of switch 46 and the output of the control path of switch 110 is connected to the input of the preferred path of retrograde transient bubble switch 112. The alternate path output of switch 112 is applied to annihilator 113. The input of the control path of switch 112 is connected to receive control signal $C_C$ and the output thereof is connected to annihilator 114. The output of the preferred path of switch 112 is connected to exclusive merge element 115 along with control signal $C_L$. The output of merge element 115 is connected to the control path input of switch 110.

In addition to the foregoing, there are additional elements included in the full adder portion of the unit primarily for the purpose of providing programming capability. For example, the output from merge element 12 is connected to the input of the preferred path of resident bubble switch 56. Control C1 signal is applied to the input of the control path of switch 56. The outputs from the control path are applied to annihilate elements 58 and 60, respectively. The alternate path from switch 10 and the alternate path from switch 56, respectively, are applied to a disjoint crossover element 61 and the connection from the alternate path of switch 10 continues therefrom to the control path input of switch 14. The preferred path output from switch 56 is applied to the preferred path input of switch 14.

The preferred path output from switch 14 is applied to a disjoint crossover 62 and from there to the input of the preferred path to resident switch 64. The alternate path output from switch 14 is applied to a disjoint crossover element 66 and from there to the preferred path input of resident bubble switch 68. Also connected to crossover element 66 is the output from a fanout gate comprising generator 70, transient switch 72 and annihilator element 74. The alternate path output from switch 72 is connected to crossover element 66. From there, this connection is made to crossover element 62 and then to the control path of switch 64.

Control signal C2 is applied to the control path input of switch 72 and from there to an exclusive merge element 76, to which control signal C4 is also applied. The output of this merge element is then applied to the control path of switch 68. The outputs of control path of switch 68 are applied respectively to annihilate elements 78 and 80.

The preferred path output from switch 68 is connected to an exclusive merge element 82 and the alternate path output from switch 68 is applied to annihilate element 84.

The alternate output path from switch 64 is connected to merge element 82; the preferred path output is connected to the control path input of switch 22; and the control path outputs of switch 64 are connected respectively to annihilate elements 86 and 88.

Control signal C3 is connected to disjoint crossover element 90 along with the output from merge element 82. Signal C3 from element 90 is connected to the control path input of retrograde resident bubble switch 92. The preferred path input of switch 92 is connected to the preferred path output from switch 32. The preferred path output from switch 92 is connected successively to exclusive merge element 94 and exclusive merge element 96. The alternate path output from switch 56 is connected through crossover element 61 to be connected to merge element 96. The alternate path output from switch 32 is connected to annihilate element 98. The control path output of switch 32 is connected to annihilate element 104. The alternate path output from switch 92 is connected to annihilate element 106 and the outputs of the control path of switch 92 are connected respectively to annihilate elements 100 and 102.

The output from merge element 96 is the function output of the entire unit. In considering the operation of the unit, the solid lines are the data stream lines and the dotted lines are the control lines. Operationally, there is no difference between a bubble being presented from a data stream to a logic element and a bubble being presented along the control line to a logic element. Further, reference should be made to FIG. 15 for an understanding of how the programming determines the arithmetic function manipulation to be performed by the unit.

Assume that the unit is to be programmed for A + B. This requires the insertion of bubbles along control lines C1 and C3. Control signal C1 programs switch 56 and control signal C3 programs switch 92.

Data stream A is applied through disjoint crossover 40, open switch 41 and exclusive merge element 45 to the control path of switch 10. Data stream B is applied directly to the preferred path input of switch 10. As noted in FIG. 9, the output of the merge element is A + B. Therefore, the input to the preferred path of switch 56 is A + B. However, since a bubble is lodged by programming in the control path of switch 56, the A + B output passes from the alternate pass thereof through crossover element 61 and through merge element 96 to the output. Any signals other than A + B, such as the AB signal from the alternate path of switch 10, is eventually diverted at switch 92 by the presence of a bubble lodged by programming in the control path thereof. The diverted bubbles are annihilated in annihilator element 106.

Now assume that the unit is programmed for A + B. This means that bubbles are sent along control lines C2 and C3 so that C2 programs switch 68 and causes a bubble from the alternate path of switch 72 to be passed through crossover elements 66 and 62 to program switch 64. C3 programs switch 92 through crossover 90. By reference to FIG. 12, it is noted that the preferred output from switch 14 is the desired signal A B. This signal is caused to take the alternate path in switch 64 and eventually passes from the unit through merge element 82, crossover element 90 and merge element 94. Any spurious signals from the alternate path of switch 14 are eventually diverted to the alternate path of switch 68 to be annihilated in annihilate element 84. Also, any spurious signals from the control path of switch 14 are eventually diverted to the alternate path of switch 92 to be annihilated by annihilate element 106. Since C1 does not program switch 56, nothing ever appears at the output of the alternate output of this switch and therefore nothing is applied to merge element 96 except the preferred signal A + B. Hence the output is the desired functional output for which the unit has been programmed.

Now assume that it is desired to program the unit for $\bar{A} + B$. Also assume that every fourth bubble in the sequence of bubbles in data streams A and B contains data. That is, the data streams carry data bubbles alternating cyclically with voids so that the signals passing a given point over a period of time would logically by $A_o$, O, O, O, $A_1$, O, O, O, $A_2$, O, O, . . . $A_n$, wherein $A_o$, $A_1$, . . . $A_n$ represents a word of data with $A_o$ being the least significant binary digit.

For $\bar{A} + B$, programming C1, C3, C5 and $C_L$ control signals are supplied to the unit. Single C1, C3 and C5 bubbles are sent out prior to or simultaneously with the arrival of data streams A and B. Control signal $C_L$ must be sent out synchronously with data stream A in a manner to be explained hereinafter.

A control signal C5 passes through the control path of switch 42 and lodges in the control path of resident bubble switch 51. Also, as it passes through switch 42, it causes a bubble generated from generator 49 to exit from the alternate path of switch 42 to pass through crossover 40 to lodge in the control path of switch 41. The lodging of this bubble causes data stream A to exit at the alternate path of switch 41 to be supplied to the control path input of switch 46.

The lodging of a bubble in the control path of switch 51 causes the bubbles produced by generator 54 to exit at the alternate path of switch 51 to be applied to the input of the preferred path of switch 110. When there is a bubble in the control path of switch 110, a bubble exits from the alternate path of switch 110 to be applied to the preferred path input of switch 46.

Logically, when there is a bubble in data stream A applied to the control path input of switch 46, there is no output from the preferred output therefrom. When there is no bubble in data stream A, there will be an output from the preferred path output of switch 46. Hence, this output applied to merge element 45 is effectively $\bar{A}$.

From this point on, the programming of the unit with respect to signals C1 and C3 is the same as described above with respect to A + B programming.

Switches 110 and 112 and their associated components provide for compensation of the loosely packed data streams (data contained in every fourth bubble). When a bubble enters switch 110 corresponding in time to a data bubble in the data stream, a bubble is inserted via control signal $C_L$ through merge element 115 to the input of the control path of switch 110. This causes switch 110 to operate as described above. While the non-data-containing bubbles are occurring, the bubble that was in the control path of switch 110 exits therefrom and is circulated through switch 112 and merge element 115 to be reapplied to the control path of switch 110 at the appropriate time. Appropriate delay components (not shown) may be inserted to accomplish this time synchronizing. Note that only one bubble is required to be inserted via control signal $C_L$.

If the data stream is packed in the manner $A_o$, $A_k$, O, O, A, $A_{k+1}$, O, O, $A_2$, $A_{k+2}$, O, . . . $A_n$, $A_{k+n}$, wherein $A_o$, $A_1$, $A_2$, . . . $A_n$ represents a first data word and $A_k$, $A_{k+1}$, $A_{k+2}$, . . . $A_{k+n}$ represents a second data word, then two bubbles would have to be inserted by control signal $C_L$, properly timed, to cause the above switching in order to produce the desired output from switch 46. This desired output would be $\bar{A}_o$, $\bar{A}_k$, O, O, $\bar{A}_1$, $\bar{A}_{k+1}$, O, O, $\bar{A}_2$, $\bar{A}_{k+2}$, O, . . . $A_n$, $A_{k+n}$. And not an output wherein the above O's would be 1's. Such extraneous 1's could cause malfunction of the logic unit.

If the data were interleaved so as to be tightly packed, then each bubble would represent a data bit in its own word sequence. In the above example, four words could be handled simultaneously. However, in this event, control signal $C_L$ would load up the circulating loop between switches 110 and 112 with four consecutive bubbles.

To clear the bubbles inserted by control signal $C_L$ for reprogramming of the unit, a bubble is inserted via control signal $C_C$ so that it is in the control path of switch 112 when the circulating bubble is in the preferred path. This causes the bubble to exit at the alternate path of switch 112 to be annihilated by annihilator 113. Assuming the spacing of the data bits as given above (viz., data bit every fourth bubble) and a tightly packed data presentation, complete clearing of the bubbles inserted by control signal $C_L$ would take four consecutive control signal $C_C$ bubbles. Of course, it may be desirable to merely insert four bubbles anytime this loop is to be cleared, so that synchronizing the $C_C$ control path would not be important.

Although data streams with related bits spaced four bubbles apart are used as an example, data bit spacing of more or less may be employed as desired. Delay components, as required, may be inserted to assure proper operation. This is particularly important in the loop described above, the carry loop between switches 22 and 26, and delay line 18 for the previous carry.

In a similar fashion it is possible to trace the programming for all eight arithmetic and logic operations listed in the table shown in FIG. 15. Specifically, the unit may be programmed to provide the following functional outputs from data streams A and B: (1) A + B, (2) A + B, (3) AB, (4) A plus B with carry, (5) $\bar{A}$ + B, (6) $\bar{A}$ B, (7) $\overline{AB}$, and (8) $\bar{A}$ plus B with carry.

While a particular preferred embodiment of the invention has been shown in FIG. 14 and described herein, it will be understood that the invention is not limited thereto, since many modifications may be made and will become apparent to those skilled in the art. For example, multiple circuits may be constructed on the same format to provide not only additional capacity, but different arithmetic and logic operations where such operations can be developed from a combination of those shown herein. Also, two data streams are described. The input capacity of the unit may readily be increased through the inclusion of additional elements.

What is claimed is:

1. A programmable magnetic bubble arithmetic and logic arrangement comprising:
 a substrate,
 a body of magnetic material capable of supporting magnetic domains secured adjacent one surface of said substrate,
 said magnetic material having bubble propagation path pattern means arranged for the selective performance of serial arithmetic and logic operations on two streams of digital information provided as magnetic bubble domains, periodic drive means coupled to said body for providing a step movement of bubbles through said bubble propagation path pattern means of said magnetic material, said bubble propagation path pattern means of said magnetic material including a plurality of transient bubble switches for respectively receiving a first and second bubble input and passing bubbles in said first input therethrough along a control path, bubbles in said second input passing therethrough along a preferred path when there is simultaneously a bubble void in said first input, bubbles in said second input passing therethrough along an alternate path when there is simultaneously a bubble occurrence in said first input, a plurality of bubble generators for respectively producing a bubble domain at each periodic step, a plurality of bubble annihilators for respectively annihilating bubble domains applied thereto, a plurality of exclusive merge elements for respectively permitting bubbles from two inputs occurring nonsimultaneously to pass therethrough to a single output, a plurality of crossover elements for respectively permitting bubbles from two inputs to pass therethrough to two respective outputs without interference, a plurality of resident bubble switches for respectively receiving a first and second bubble input, a bubble in said first input lodging in a control path until a subsequent bubble causes expulsion thereof, bubbles in said second input passing therethrough along a preferred path when there is a simultaneous bubble void in said first input, bubbles in said second input passing therethrough along an alternate path when there is a simultaneous bubble occurrence in said first input, and said transient bubble switches, bubble generators, annihilators, merge elements, crossover elements and resident bubble switches being interconnected in at least partially defining said bubble propagation path pattern means in such a manner to achieve a plurality of arithmetic and logic operations on two streams of digital information, programming thereof being at least in part by lodging bubbles in the control paths of appropriate resident bubble switches.

2. A programmable magnetic bubble arithmetic and logic arrangement as set forth in claim 1, wherein one of said arithmetic and logic operations on said two streams of digital information is an operation of addition including carry, said bubble propagation path pattern means of said magnetic material also including delay means therein for accepting previous carry information in performing the addition operation.

3. A programmable magnetic bubble arithmetic and logic arrangement as set forth in claim 1, wherein said arithmetic and logic operations on said two streams of digital information include the operation of OR, the operation of exclusive OR, the operation of AND, and the operation of addition with carry, and on one of said two streams of digital information includes the operation of NOT.

4. A programmable magnetic bubble arithmetic and logic arrangement as set forth in claim 1, wherein at least one of said resident bubble switches comprises two transient bubble switches.

5. A programmable magnetic bubble arithmetic and logic arrangement as set forth in claim 1, wherein said bubble propagation path pattern means of said magnetic material further includes control inputs from which digital information stream inputs are separately received by elements of said bubble propagation path pattern means for selectively programming said arrangement to produce a predetermined functional output.

6. A programmable magnetic bubble arithmetic and logic arrangement as set forth in claim 1, wherein said bubble propagation path pattern means includes a first and second of said transient bubble switches interconnected to define a loop extending through the control path of said first switch in which a bubble may be circulated so as to logically process data included in said streams of digital information for which said arrangement is programmed from extraneous data interleaved therewith.

7. A programmable magnetic bubble arithmetic and logic arrangement as set forth in claim 6, wherein the input to the control path of said first switch is connected to an exclusive merge element for the insertion of programming bubbles.

8. A magnetic bubble arithmetic and logic arrangment, comprising:

a substrate, a body of magnetic material capable of supporting magnetic domains secured adjacent one surface of said substrate, said magnetic material having bubble propagation path pattern means arranged for the selective performance of serial arithmetic and logic operations on first and second data streams of digital information provided as magnetic bubble domains, periodic drive means coupled to said body for providing a step movement of bubbles through said bubble propagation path pattern means of said magnetic material, said bubble propagation path pattern means of said magnetic material including a full adder comprising a first half adder for producing a first output when both said first and second data streams include a bubble and a second output when one but not both of said first and second data streams includes a bubble, step delay means for receiving the first output from said first half adder and delaying said output a periodic step, an exclusive merge element connected to receive the output fromm said step delay means, a second half adder connected to receive the output from said exclusive merge element and the second output from said first half adder, carry means connected to said second half adder for producing a bubble whenever the output from said exclusive merge element and the second output from said first half adder simultaneously include a bubble, and said exclusive merge element being connected to receive the output from said carry means, the output from said second half adder being the serial binary addition starting with the least significant digit of said first and second data streams including carry.

9. A magnetic bubble arithmetic and logic arrangement as set forth in claim 8, wherein said first half adder includes a first transient bubble switch for receiving said first data stream at its control input and said second data stream at its preferred input and passing bubbles from said first stream via its control output, bubbles from said second stream being passed therethrough via its preferred output when there is a bubble void in said first stream, and bubbles from said second stream being passed therethrough via its alternate output when there is simultaneously a bubble from said first stream received at its control input, a second exclusive merge element connected to the control and preferred outputs of said first switch, and a second transient bubble switch connected to receive the output from said second exclusive merge element at its preferred input and to receive the alternate output from said first switch at its control input, the control output of said second switch being applied to said step delay means and the preferred output of said second switch being applied to said second half adder.

10. A magnetic bubble arithmetic and logic arrangement, comprising:

a substrate, a body of magnetic material capable of supporting magnetic domains secured adjacent one surface of said substrate, said magnetic material having bubble propagation path pattern means arranged for the selective performance of serial arithmetic and logic operations on at least one data stream of digital information provided as magnetic bubble domains, periodic drive means coupled to said body for providing a step movement of bubbles through said bubble propagation path pattern means of said magnetic material, said bubble propagation path pattern means of said magnetic material including a NOT circuit comprising a transient bubble switch having its control path input connected to said data stream, a bubble generator, and a resident bubble switch connected to receive bubbles from said generator at its preferred path input and connected to receive a program bubble at its control path input, the alternate path output being connected to the preferred path input of said transient switch, such that the absence of bubbles in said data stream produces an output from the preferred path of said transient switch and the presence of a bubble in said data stream produces a void from the preferred path of said transient switch.

11. A magnetic bubble arithmetic and logic arrangement as set forth in claim 10, and including programming loop means between the alternate path output of said resident switch and the preferred path input of said transient switch, said loop means including second and third transient bubble switches interconnected to define a loop extending through the control path of said second transient switch in which a bubble may be circulated so as to logically process data included in said data stream for which said arrangement is programmed from extraneous data interleaved therewith, the input of the control path of said second transient switch being connected for the insertion of programming bubbles.

* * * * *